J. H. OGLES.
TRAP FOR ANIMALS AND FOWLS.
APPLICATION FILED APR. 3, 1919.
1,315,391.
Patented Sept. 9, 1919.
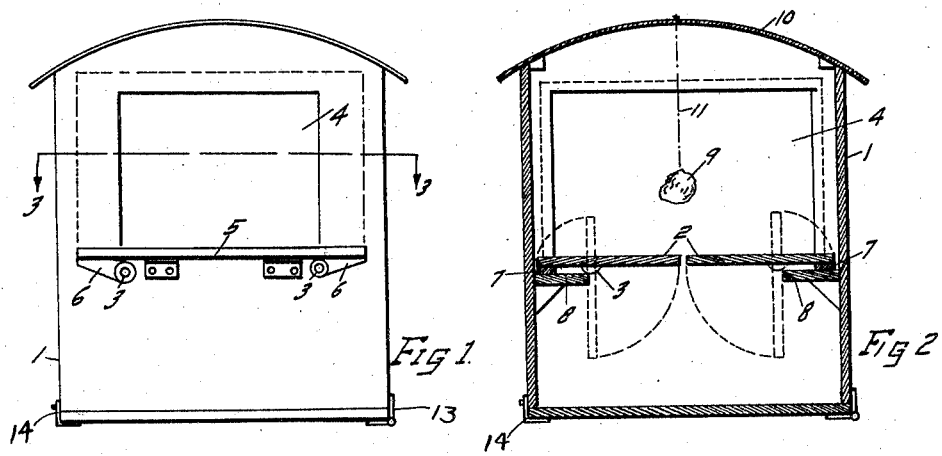
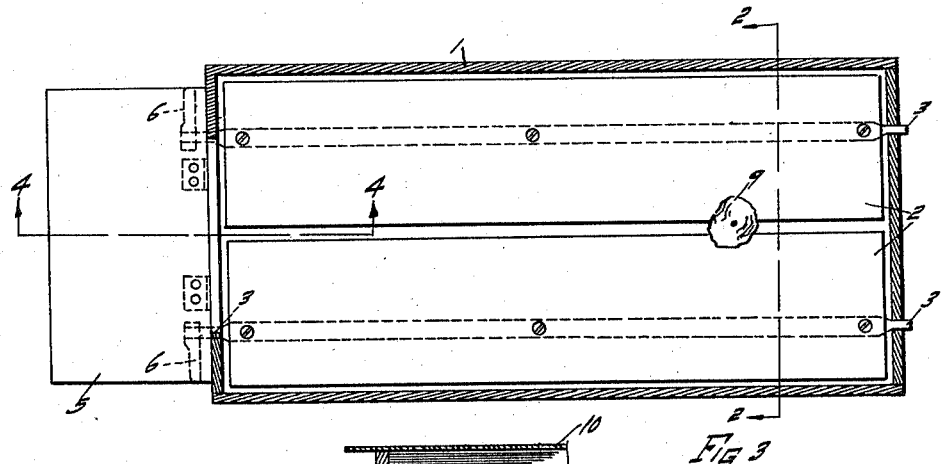
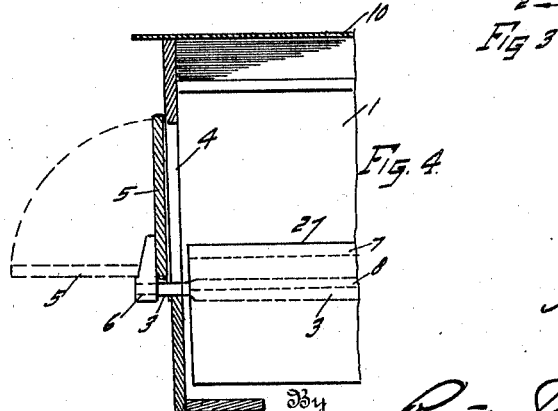

UNITED STATES PATENT OFFICE.

JAMES HENRY OGLES, OF WESTOVER, ALABAMA.

TRAP FOR ANIMALS AND FOWLS.

1,315,391.  Specification of Letters Patent.  Patented Sept. 9, 1919.

Application filed April 3, 1919. Serial No. 287,356.

*To all whom it may concern:*

Be it known that I, JAMES HENRY OGLES, a citizen of the United States of America, residing at Westover, in the county of Shelby and State of Alabama, have invented certain new and useful Improvements in Traps for Animals and Fowls, of which the following is a specification.

My invention relates to a trap of the self set and ever set type especially designed for catching all species of animals and fowls.

The object of my invention is to priduce a trap which is simple in construction, comparatively inexpensive and the parts of which are so designed and coördinated as to enable the trap to catch any quarry which may enter it whether animal or fowl.

More particularly my invention comprises a trap having a vertically swinging door which when open forms an entrance platform giving access to and adapted to restrain the opening of a pair of longitudinal hinged trap doors which as they open operate levers adapted to close the entrance door behind the quarry so that it cannot avoid falling into the bottom of the trap. This occurs only when the weight of the quarry on the trap doors overcomes the restraint imposed by the quarry's weight remaining on the platform door. The apparatus is so arranged that the trap doors cannot drop until practically the whole weight of the quarry is imposed thereon, thus making escape impossible.

My invention also comprises other novel details of construction and arrangements of parts, which in their preferred embodiment only are illustrated in the accompanying drawings which form a part of this specification, and in which:—

Figure 1 is a front view of the trap with the door open.

Fig. 2 is a sectional view taken on the line 2—2 of Fig. 3.

Fig. 3 is a sectional view taken on the line 3—3 of Fig. 1.

Fig. 4 is a partial sectional view taken on the line 4—4 of Fig. 3, and showing the trap doors dropped and the front door in closed position.

Similar reference numerals refer to similar parts throughout the drawings.

The trap may be constructed in any size or of any material dependent on the quarry which it is intended to catch. As shown, the trap comprises an elongated box 1 having two longitudinally disposed trap doors 2 hingedly mounted on pivots or pintles 3 which are journaled in the end walls of the box at a point approximately midway between the top and bottom thereof. In the front wall of the box I provide an opening 4 adapted to be closed by an entrance door 5 hinged at the bottom edge of the opening and adapted to fold upwardly as it closes the opening. The door in open position forms an entrance platform which is supported in approximately horizontal position by resting on the adjacent ends of the pivots or pintles 3 which project through the front of the box and each of which carries an outturned crank arm 6 so disposed that as the trap doors in dropping swing downwardly to dotted position, Fig. 2, the cranks will swing upwardly and by engaging the under face of door 5 will force the door upwardly to close the opening 4, as shown in Fig. 4. The outer side edges of the trap doors 2 are each provided with a counterweight 7 which engages a stop platform 8 when the doors resume horizontal position, these platforms extending outwardly to the axis of the doors so as to close the opening between the side walls and the axes of the doors when the latter are in dropped or open position, see dotted lines Fig. 2. The bait is disposed near the back end of the trap above the trap doors, being indicated at 9 as suspended from the top 10 of the trap by a string or other suitable supporting member 11. To remove the quarries the bottom 12 may be adapted to open on hinges 13, catches 14 being provided to hold it normally closed. The door 5 when open is unbalanced so that as soon as released from any restraint it will drop by gravity back to open position as the trap resets itself.

The trap being of a self setting and ever set type the trap doors and the door 5 will stand normally in the position shown in Fig. 3, and as the quarry enters his weight will rest first fully on the entrance door 5 as a platform, which will act through the cranks 6 to hold the trap doors firmly in raised position. As the quarry advances into the trap more and more of its weight will rest on the inner free edges of the trap doors and less and less of its weight on the platform, but due to the leverage obtained through the cranks 6 but little weight on the platform is needed to restrain the opening of the trap doors. When, however, a fully overbalanced condition exists the trap doors will suddenly drop and in doing so the cranks 6 will snap the platform door 5 upwardly to closed position behind the quarry forcing it into the trap and making it impossible for the quarry to escape.

The arrangement of my trap is such that the quarry is permitted to rest almost its entire weight on the trap doors before the latter are free to drop and for this reason is superior to any trap in which the quarry will balance its weight on the trap door or doors as the latter will tend to become unstable in time to warn the quarry before a completely overbalanced condition exists. When the trap doors swing up again, the cranks 6 are withdrawn from behind the entrance door which will drop by gravity to its open position and the trap is again set ready for another quarry.

Having thus described my invention, what I claim as new and desire to secure by Letters Patent, is:—

1. In a trap having an entrance opening, a hinged upwardly folding entrance door for closing said opening, pivoted trap doors having their pivots at one end extended to points adjacent and at right angles to the axis of said entrance door, and cranks on said axes arranged to slidingly engage the outer face of said door, said cranks being responsive to weight on the entrance door to restrain the dropping of the trap doors and to weight on the trap doors to close said entrance door as the trap doors drop.

2. In a trap having an upwardly swinging self opening entrance door, a pair of counterbalanced trap doors within the trap adapted to swing on pivots which project under said entrance door, and cranks on said pivots on which said entrance door rests when open and which are adapted to move with the opening of the trap doors to close said entrance door.

3. In a trap having a hinged self opening entrance door in its upper portion, a pair of trap doors mounted on pivots which at one end project toward said entrance door, means to counterweight the outer side edges of the trap doors to hold them normally closed, ledges extending inwardly from the sides of the trap to a point adjacent to the axes of the trap doors and adapted to form stops for the counterweighted edges of said trap doors, out-turned cranks on said pivots on which said entrance door rests when open and which are adapted to close said entrance door as the trap doors open, substantially as described.

In testimony whereof I affix my signature.

JAMES HENRY OGLES.

Witness:
NOMIE WELSH.

Copies of this patent may be obtained for five cents each, by addressing the "Commissioner of Patents, Washington, D. C."